3,169,929
DEFOAMING AQUEOUS LIQUIDS
William F. Nekervis, Midland, and Robert A. Canute, Mount Pleasant, Mich., assignors to The Dow Chemical Company, Midland, Mich., a corporation of Delaware
No Drawing. Filed Sept. 12, 1960, Ser. No. 55,126
2 Claims. (Cl. 252—79.1)

This invention relates to defoaming and more particularly is concerned with a method for preventing foaming in aqueous, foam-producing strong electrolyte solutions and to such foam inhibited aqueous compositions.

In many industrial operations, the necessary utilization of certain reactant and/or process steps results in the production of hard-to-break objectionable foams. For example, in the photoengraving industry foaming of the conventionally used ferric chloride etching solution many times is encountered because of the vigorous agitation employed in the etching operations. This foaming results in the build-up of large foam heads in the tanks, slowing of the revolving paddles of the etching machine and even in overflow of the foam out of ports and shaft housings of the machine. This foaming not only is objectionable in that the resulting engraved plate or printed circuit is of reduced quality, but additionally the overflow of foam out of the machine leads to general equipment corrosion problems, slippery floors and generally undesirable working conditions.

It is a principal object of the present invention to provide a novel method for inhibiting foaming of aqueous foam producing electrolyte solutions.

It is a further object of the present invention to provide antifoamants for use with foam producing basic, neutral and acidic aqueous electrolyte solutions which antifoamants provide a short "foam-break" time and short time to give a clear solution.

It is another object of the present invention to provide foam inhibited compositions which have a long shelf life.

It is still a further object of the present invention to provide novel foam inhibited compositions of ferric chloride.

It is another object of the present invention to provide novel antifoaming agents for ferric chloride photoengraving solutions which antifoamants are useful at low concentrations and which have a pleasant odor when used in such solutions.

These and other objects and advantages will become apparent from the detailed description presented hereinafter.

In accordance with this invention, effective antifoaming action or inhibition of foaming is achieved in aqueous, foam producing strong electrolyte solutions, and especially ferric chloride solutions, by the addition of a foam inhibiting amount of a dialkyl ester of a dicarboxylic acid thereto. Particularly useful diesters are those compounds wherein the dicarboxylate anion of the acid portion of the ester is a member selected from the group consisting of oxalate, a saturated aliphatic fatty acid dicarboxylate wherein the hydrocarbon chain contains from 1 to about 6 carbon atoms, an unsaturated aliphatic fatty acid dicarboxylate wherein the hydrocarbon chain contains from 2 to about 6 carbon atoms and an aromatic dicarboxylate, and, where the alcohol portion of the ester has alkyl groups containing from 1 to about 10 carbon atoms.

The novel method and compositions of the instant invention are effective in breaking and eliminating foams in aqueous electrolyte solutions containing up to about 50 percent or more by weight solute when the antifoaming agent is used at a minimum concentration of about 2 parts per million in the aqueous solution. Ordinarily the antifoamant will be used over a concentration range of from about 10 parts per million up to the limit of solubility of the antifoamant in the foam producing electrolyte. These antifoaming agents find particular utility when used with foam producing ferric chloride solutions containing up to about 45 percent or more $FeCl_3$ by weight (i.e. up to about 47.5 Bé. at 20°/4° C.) such as are used in the photoengraving art. In this latter application the amount of the agent to be employed will range from about 5 parts per million up to the solubility limit of the agent in the aqueous ferric chloride. (With diethyl phthalate, for example, this limit of solubility is about 50 parts per million.)

Use of antifoamants in concentrations above the solubility limit can result in either formation of a "scum" or film on the surface of the solution or of an immiscible phase dispersed or settled within the solution. These side effects are particularly objectionable in the photoengraving art when they appear upon use of the etching solutions.

However, in other areas where the appearance of such films or dispersions may not be bothersome, e.g. in the defoaming of dilute, aqueous acidic bromine solutions, foam control of from 2 to about 20 percent caustic soda solution, foam inhibition of acidified and oxidized brine solution and the like, amounts of antifoamant in excess of the upper solubility limit of the compound in the aqueous solution can be utilized if desired.

The novel antifoamant compositions of the instant invention are effective at solution temperatures up to about 90° C. However, ordinarily these will be used at temperatures below about 70° C. and they have been found to be most effective over a temperature range of from about 50° C. down to the freezing point of the solution. However, it has been found that if a solution containing the antifoamant has been allowed to freeze and solidify, upon redissolution, the antifoaming agent still is effective.

In actual operation the antifoaming agent can be added to a solution at the time of use or processing. Preferably in the case of prepared solutions which are stored before use, the agent will be added at the time of solution make-up.

The following examples will serve to illustrate further the present invention but are not meant to limit it thereto.

EXAMPLE 1

A standardized foam test was developed to obtain reproducible data on the foaming characteristics of aqueous electrolyte solutions. The test is divided into two parts: The first part is an Aeration Test designed to give an exaggerated foam depth. The second part is a Bottle Shake Test used to determine the time for foam breaking and solution clearing, i.e. time for foam dissipation after solution agitation is stopped. The procedures for the tests are as follows:

Part 1.—Aeration Test

Air is passed at a set rate, for example, 2.4 liters per minute, through a fritted glass air sparger centered near the bottom of a one liter graduated cylinder containing 200 milliliters of test solution.

The air movement through the solution is continued for five minutes to permit the so-produced foam to come to equilibrium. The total height of the combined foam and solution column in the graduate is noted and the air agitation then stopped.

Part 2.—Bottle Shake Test

Two hundred milliliters of test solution are placed in a clean 16 ounce square bottle and the bottle then capped or sealed.

The bottle and contents are then agitated for one minute by shaking vertically in a 12 to 18 inch oscillation at a rate of two to three shakes per second. The bottle then is put down, on a table or bench for example, in an upright position. The total height of foam produced is measured, and the foam "break time" and solution "clear time" is recorded.

By "break time" is meant the time, in seconds, from the stoping of bottle agitation until the first clear patch of solution surface is visible. "Clear time" is defined as the time from the stopping of bottle agitation until the solution surface is about 98 percent clear, i.e. only 2 to 5 bubbles remain around the perimeter of the solution at its upper face.

The results of a number of tests run with a variety of different antifoamants at various concentration levels and using a number of different foam producing electrolyte solutions are presented in Table I which follows:

In addition to the above-described quantitative measurements, in qualitative studies about 30 parts per million of diethylphthalate were found to satisfactorily prevent foaming of a dilute, acidic aqueous bromine solution; di-n-octyl tartrate, about 200 parts per million, was found both to be compatible with and an effective defoamer for a 40 percent ferric chloride etching solution; an acidified, oxidized mixed halide salt solution was satisfactorily defoamed by addition of about 20 parts per million diethylphthalate thereto; and, about 5 parts per million diethylphthalate satisfactorily prevents foaming of a 5 percent ferric chloride (about 5 Bé. at 20°/4° C.) solution.

Various modifications can be made in the method of the present invention without departing from the spirit or scope thereof for it is understood that we limit ourselves only as defined in the appended claims.

We claim:
1. An aqueous ferric chloride etching solution containing a diester member selected from the group consisting of diethyl phthalate, dibutyl phthalate, dimethyl phthalate, diethyl oxalate and diethyl fumarate, said ferric chloride etching solution containing from about 5 to about 45 weight percent ferric chloride and the amount of said diester member ranging from about 2 parts per million up to the solubility limit of said member in said aqueous ferric chloride etching solution.

2. A composition consisting essentially of an aqueous ferric chloride solution and containing from about 5 to about 50 parts per million diethyl phthalate, said ferric chloride solution containing from about 5 to about 45 weight percent ferric chloride.

TABLE I

| Test No. | Electrolyte Solution | | Antifoamant | | Aeration Test (Height of foam and solution, ml.) | Bottle Shake Test | | |
|---|---|---|---|---|---|---|---|---|
| | Composition | Conc., wt. percent solute | Composition | Conc., p.p.m. | | Foam Height, mm. | Foam Break time (seconds) | Solution clear time (seconds) |
| Series A: | | | | | | | | |
| 1 | FeCl₃ | 39 | None-Control Sol'n | | 1,100 | 10 | 100 | >600 |
| 2 | FeCl₃ | 39 | Diethylphthalate | 20 | 600 | 10 | 3 | 12 |
| Series B: | | | | | | | | |
| 3 | FeCl₃ | 40 | None-Control Sol'n | | 750 | 10 | 13 | 20 |
| 4 | FeCl₃ | 40 | Diethylphthalate | 10 | 290 | 5 | 5 | 10 |
| 5 | FeCl₃ | 40 | Dibutylphthalate | 20 | 205 | 1-2 | 5 | 5 |
| 6 | FeCl₃ | 40 | Diethyloxalate | ¹ 400 | 210 | (*) | | |
| 7 | FeCl₃ | 40 | Diethylfumarate | 100 | 450 | 5 | 7 | 10 |
| Series C: | | | | | | | | |
| 8 | FeCl₃+FeSO₄ ² | 40/3 | None-Control Sol'n | | | 5 | 0 | 240 |
| 9 | FeCl₃+FeSO₄ ² | 40/3 | Diethylphthalate | 2 | | 5 | 0 | 20 |
| Series D: | | | | | | | | |
| 10 | Caustic Soda | 20 | None-Control Sol'n | | | 15 | 17 | 90 |
| 11 | do | 20 | Diethylphthalate | 10 | | 2.5 | 2-3 | 2-3 |
| Series E: | | | | | | | | |
| 12 | FeCl₃ | 39 | None-Control Sol'n | | 1,100 | 10 | 90 | >180 |
| 13 | FeCl₃ | 39 | Diethylphthalate ³ | 20 | | 2.5 | 6 | 12 |
| 14 | FeCl₃ | 39 | Dimethylphthalate ³ | 100 | | 5.5 | 9 | 12 |
| 15 | FeCl₃ | 39 | Diethylphthalate ⁴ | 20 | 750 | 10 | 8 | 12 |
| 16 | FeCl₃ | 39 | Dimethylphthalate ⁴ | 100 | 900 | 15 | 35 | 60 |
| Series F: | | | | | | | | |
| 17 | FeCl₃ | 27 | None-Control Sol'n | | 700 | 20 | 150 | >300 |
| 18 | FeCl₃ | 27 | Diethylphthalate | 10 | 300 | 7.5 | 5 | 6 |
| 19 | FeCl₃ | 8 | None-Control Sol'n | | | 20 | 13 | >300 |
| 20 | FeCl₃ | 8 | Diethylphthalate | 20 | | 7.5 | 4 | 5 |

¹ No visible film on solution surface. This concentration is below the limit of solubility of the diethyloxalate in the ferric chloride solution.
² Composition of Rotogravure grade iron chloride solution.
³ Solution containing antifoamant permitted to stand about 2 weeks before testing.
⁴ Solution containing antifoamant permitted to stand about 6 months before testing.
* No foam formed.

References Cited in the file of this patent

UNITED STATES PATENTS

| | | |
|---|---|---|
| 1,969,678 | White et al. | Aug. 7, 1934 |
| 2,045,551 | Iddings et al. | June 23, 1936 |
| 2,101,089 | Novak | Dec. 7, 1937 |
| 2,297,276 | Atwood | Sept. 29, 1942 |
| 2,382,698 | Donlan | Aug. 14, 1945 |
| 2,430,858 | Borsoff et al. | Nov. 18, 1947 |
| 2,609,344 | Johnson | Sept. 2, 1952 |
| 2,640,766 | Easley et al. | June 2, 1953 |
| 2,828,192 | Langsfeld | Mar. 25, 1958 |